(12) United States Patent  
Julisch et al.

(10) Patent No.: US 9,094,457 B2  
(45) Date of Patent: Jul. 28, 2015

(54) AUTOMATED NETWORK DEPLOYMENT OF CLOUD SERVICES INTO A NETWORK

(71) Applicant: International Business Machines Corporation, Armonk, NY (US)

(72) Inventors: Klaus Julisch, Rueschlikon (CH); Georg Ochs, Boeblingen (DE); Matthias Schunter, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 52 days.

(21) Appl. No.: 13/953,006

(22) Filed: Jul. 29, 2013

(65) Prior Publication Data

US 2014/0033268 A1    Jan. 30, 2014

(30) Foreign Application Priority Data

Jul. 30, 2012    (GB) .................................. 1213507.5

(51) Int. Cl.
| | |
|---|---|
| *H04L 29/06* | (2006.01) |
| *G06F 9/445* | (2006.01) |
| *G06F 9/50* | (2006.01) |
| *G06F 21/53* | (2013.01) |

(52) U.S. Cl.
CPC ........ *H04L 63/20* (2013.01); *G06F 8/60* (2013.01); *G06F 9/5072* (2013.01); *H04L 63/0236* (2013.01); *G06F 21/53* (2013.01); *H04L 63/0209* (2013.01)

(58) Field of Classification Search
CPC ...................................................... H04L 63/20
USPC ............................................................ 726/1
See application file for complete search history.

(56) References Cited

U.S. PATENT DOCUMENTS

| | | | |
|---|---|---|---|
| 7,698,429 | B1 | 4/2010 | Houlding et al. |
| 2008/0250473 | A1 | 10/2008 | Massimiliano et al. |
| 2009/0307685 | A1 | 12/2009 | Axnix et al. |
| 2010/0235539 | A1* | 9/2010 | Carter et al. ................... 709/238 |
| 2011/0219434 | A1* | 9/2011 | Betz et al. .......................... 726/5 |
| 2011/0231552 | A1 | 9/2011 | Carter et al. |
| 2011/0270721 | A1 | 11/2011 | Kusterer |
| 2011/0296021 | A1 | 12/2011 | Dorai et al. |

(Continued)

FOREIGN PATENT DOCUMENTS

| | | |
|---|---|---|
| WO | 2005003968 A1 | 1/2005 |
| WO | 2008073665 A1 | 6/2008 |

OTHER PUBLICATIONS

Konstantinou et al., "An Architecture for Virtual Solution Composition and Deployment in Infrastructure Clouds," VTDC 2009, Jun. 15, 2009, ACM, pp. 9-17.

(Continued)

*Primary Examiner* — Dant Shaifer Harriman  
(74) *Attorney, Agent, or Firm* — Cantor Colburn LLP (57) ABSTRACT

A method for automated network deployment of cloud services into a network is suggested. The method includes receiving a certain cloud service with a certain resource protection template specifying an isolation policy for isolating zones in the network, receiving certain customer protection parameters specifying customer needs regarding protection in the network, providing security requirements by matching the received resource protection templates and the received customer protection parameters, and automatically deploying the certain cloud service into the network by using the provided security requirements.

13 Claims, 4 Drawing Sheets

(56) References Cited

U.S. PATENT DOCUMENTS

2012/0072597 A1 3/2012 Teather et al.
2013/0117806 A1* 5/2013 Parthasarathy et al. ............ 726/1
2013/0326599 A1* 12/2013 Bray et al. ........................ 726/6

OTHER PUBLICATIONS

A. Hedenlind and P. Tjämberg, "Network Services and Tool Support for Cloud Environments," KTH Information and Communication Technology, Stockholm 2011, pp. 1-116.
Cloud Computing Journal, [online]; [retrieved on May 6, 2013]; retrieved from the Internet http://cloudcomputing.sys-con.com/node/928128 Lori Macvittie,"Open Virtualization Format: A Few Layers Short of a Full Stack," Virtualization: Blog Post, May 11, 2009, pp. 1-7.
VMWARE/Blogs, [online]; [retrieved on May 6, 2013]; retrieved from the Internet http://blogs.vmware.com/vapp/2009/07/selfconfiguration-and-the-ovf-environment.html Martin Amdisen,"Self-Configuration and the OVF Environment," Jul. 14, 2009, pp. 1-3.
DMTF,"Open Virtualization Format White Paper," OVF Version 1.0.0e, Version 1.0.0, DSP2017, Feb. 6, 2009, pp. 1-39.
H. Yoshida, R. Take, H. Kishimoto and Y. Hibi, "Service oriented Platform," Fujitsu Sci. Tech. J. vol. 46, No. 4, Oct. 2010, pp. 1-10.

* cited by examiner

Fig. 5

AUTOMATED NETWORK DEPLOYMENT OF CLOUD SERVICES INTO A NETWORK

PRIORITY

This application claims priority to Great Britain Patent Application No. 1213507.5, filed Jul. 30, 2012, and all the benefits accruing therefrom under 35 U.S.C. §119, the contents of which in its entirety are herein incorporated by reference.

BACKGROUND

The invention relates to a method, to a provider, and to a system for automated network deployment of cloud services into a network.

In US 2011/0231552 A1, techniques for intelligent service deployment are described. Cloud and service data are evaluated to develop a service deployment plan for deploying a service to a target cloud processing environment. When dictated by the plan or by events that trigger deployment, the service is deployed to the target cloud processing environment in accordance with the service deployment plan.

In US 2011/0296021 A1, enabling service virtualization in a cloud is shown. A service-level specification for information technology services is obtained from a user. The service-level specification is mapped into an information technology specific deployment plan. Information technology specific resources are deployed in accordance with the information technology specific deployment plan to provide the information technology services.

In US 2012/0072597 A1, templates for configuring cloud resources are shown. Examples include encapsulating cloud configuration information in an importable and exportable node template. Node templates can also be used to bind groups of nodes to different cloud subscriptions and cloud service accounts. Accordingly, managing the configuration of cloud based resources can be facilitated through an interface at a computing component. Templates can also specify a schedule for starting and stopping instance running within a resource cloud.

In US 2011/0270721 A1, monitoring application interactions with enterprise systems is described. Reference US 2011/0270721 A1 shows a deployment and distribution plan for deploying and distributing services and applications. Moreover, services may be created by a provider of an enterprise system or by another source trusted by the enterprise to develop secure services to interface with the enterprise system. Applications may be created by third party developers, by the provider, or by others. Once the provider has finished creating a new service for an enterprise system, the provider system may deploy the service to an ecommerce/store system. Similarly, once a developer has completed development of an application, the development system may deploy the application to the store system.

In Hedenlind's, "Network Services and Tool Support for Cloud Environments", Stockholm 2011, network services and tool support for cloud environments are described. Hedenlind's article shows that virtualization of servers and network infrastructure is an effective way to reduce hardware costs as well as power consumption. Today's cloud systems are often used to handle virtualization of servers but lack the ability of deploy and configure network equipment. Facilitating network equipment configuration within a cloud environment may make it possible to create complete virtual networks along with well known and proven features of cloud computing today.

In H. Yoshida, R. Take, H. Kishimoto and Y. Hibi, Service oriented Platform, a service oriented platform is shown. H. Yoshida, R. Take, H. Kishimoto and Y. Hibi, Service oriented Platform describes a service oriented platform (SOP) as an infrastructure for providing emerging cloud services. As a combination of servers, storage systems, networks and software, SOP is a platform for cloud-era services merging virtualization and operation technologies. SOP design objectives and the architecture for achieving them are discussed with a focus on server-centric virtualization for automatically developing application systems from the viewpoint of servers and an evolution-oriented architecture for extending and upgrading the service platform without interrupting services.

Further, the IBM Tivoli® Service Automation Manager (TSAM) is a known software tool that enables users to request, deploy, monitor and manage cloud computing services.

Resource allocation templates complement the procedural programming model of the Tivoli Services Automation Manager (TSAM) with a declarative element. Resource allocation templates are attached to service nodes and they specify the requirements that these service nodes have on their hosting environment, i.e., only those data center resources that meet the requirements specified in a node's resource allocation template can instantiate the node. Example requirements include the requirement of a specific hardware platform to host the node, specific hardware resources (e.g., 2 CPUs or 4 GB RAM), or specific operating systems. Further, the resource group setting within a resource allocation template allows for the specification of predefined resource pools. In general, any resource classification attribute in the Change and Configuration Management Database (CCMDB) may be used to define requirements. Resources in the CCMDB are classified according to the Common Data Model (CDM), and have attributes that are specific to their class. This allows, for example, for specifying that certain service nodes may be instantiated on physical resources that belong to the TEST pool. Resource allocation templates are used when provisioning higher-level service nodes, e.g., an IBM WebSphere® instance, which have requirements on their hosting environment.

The concept of resource allocation templates creates redundant ways of managing services in TSAM. For example, one can either use a resource allocation template to specify that a WebSphere node requires a pSeries logical partitioning (LPAR), and these LPARs may be provided and managed by some other means. Alternatively, it is possible to write a more elaborate build plan that contains the same knowledge. One can then provision the LPAR and in a next step install the WebSphere node "on top" of it. In the first case, LPARs are CCMDB objects with no TSAM representation. In the second case, LPARs are TSAM service nodes. TSAM itself offers no guidance on how to choose between these two options.

Once actual IT resources are configured and a service node is deployed, this is documented in a resource allocation record. Resource allocation records are records containing information about the resources that are allocated for a specific service component. Consequently, resource allocation records also contain pointers to the respective Configuration Items (CIs) that represent the respective resources in the CCMDB. If, for example, a WebSphere managed node is deployed on a pSeries LPAR, the CI representing this LPAR would be referenced by the resource allocation record attached to the WebSphere managed node in the service topology instance. Each deployed service instance is described by a service topology instance in the data center. There are no points of variability in service topology instances.

TSAM relies on the CCMDB in order to access information about resources in the managed data-center. In addition to read access, TSAM is also able to modify contents of the CCMDB to reflect changes done to the environment through the execution of TSAM management processes. TSAM does not, however, require CCMDB, but rather can either work by itself, or for more advanced functionality, in combination with CCMDB. It is also possible that multiple different resource allocation templates are attached to a node in the service topology template, meaning that the node can be deployed on different kinds of resources.

The execution of management plans, like build or modification plans, is divided into a preparation phase and an execution phase. Operations to be performed in the execution phase are defined by the tasks in the management plan template. The preparation phase is defined through workflows and comprises multiple automated, human/manual, and customizable tasks. Examples for manual tasks are:

1. A topology customization task where the user fixates points of variability in the service topology template.

2. The user can edit co-location settings to define which service nodes may be deployed to shared physical resources, and which ones are to occupy their own individual resources.

3. After having defined the co-location settings, the required number of physical resources have to be assigned by the responsible person, typically the data center administrator. In doing so, the responsible person may honor the constraints in any applicable resource allocation templates.

An automated operation in any management plan is the creation and maintenance of the service topology instance, which may be considered e.g., as the TSAM-internal representation of "real-world" deployed services. All data that is relevant for managing a service is stored and maintained in its service topology instance.

The Open Virtualization Format (OVF) is a standard for specifying virtual appliances. A virtual appliance is a preconfigured and ready-to-deploy unit consisting of one or more Virtual Machines (VMs), the guest OSs and applications running on them, and potentially application data. OVF is a standard that defines how to package these (multiple) software components along with XML-formatted meta-data into a single portable package. The XML meta-data specifies, among other things, the parameters needed to configuring the guest OS and applications. Moreover, using the concept of OVF environments, it is possible to add dynamic run-time parameters that depend on the environment such as IP addresses, network masks, DNS server addresses, etc. These run-time parameters are processed by a helper program called activation engine that is installed on the guest OS where it is launched upon first system startup (see reference Open Virtualization Format White Paper, Feb. 6, 2009 by DMTF).

The OVF format together with an activation engine offers a workable solution for installing even complex solutions, a.k.a. virtual appliances, consisting of multiple Virtual Machines (VMs), their guest OS, applications, and data.

A further aspect is to plan the deployment of cloud services (a term that in the following is used synonymously with virtual appliances). Planning is the task of identifying where in the physical infrastructure a cloud service may be deployed. It further determines the environmental settings that have to be configured for the cloud service to operate correctly in its physical infrastructure. Examples of such environmental settings are the IP addresses of VMs as well as the DNS or LDAP servers to be used. Planning for environmental dependencies also includes more subtle points, such as the configuration of load-balancers so they correctly interpret application semantics and route session traffic to always the same server (see reference Self-Configuration and the OVF Environment, Jul. 14, 2009, at http://blogs.vmware.com/vapp/2009/07/selfconfiguration-and-the-ovfenvironment.html).

To guide the planning process, it may be advantageous to use declarative policies such as resource allocation templates as described above. In the following, a declarative way of expressing security policies is proposed. In particular, IP-level isolation policies, a.k.a. TCP/IP firewalling policies, are considered.

Another aspect of clouds is the management of resources, such as storage, networks, and VMs, and their connectivity and isolation, respectively. A simple connectivity policy may allow any resource to access any other resource. Such a policy may raise, however, security concerns because threats such as viruses, malicious users, or malfunctioning applications can easily propagate between resources.

Recapitulating, conventional enterprise services are designed and deployed on a per instance basis. E.g., components for services may be offered that are then extended and adapted to a specific customer. The customer then manually installs the service, which may be an application, while performing integration and adaptation tasks.

SUMMARY

In one embodiment, a method for automated network deployment of cloud services into a network includes receiving a certain cloud service with a certain resource protection template specifying an isolation policy for isolating zones in the network; receiving certain customer protection parameters specifying customer needs regarding protection in the network; providing security requirements by matching the received resource protection template and the received customer protection parameters; and automatically deploying the certain cloud service into the network by using the provided security requirements.

In another embodiment, a provider for automated network deployment of cloud services into a network includes a first receiver configured to receive a certain cloud service with a certain resource protection template specifying an isolation policy for isolating zones in the network; a second receiver configured to receive certain customer protection parameters specifying customer needs regarding protection in the network; a preparer configured to provide security requirements by matching the received resource protection templates and the received customer protection parameters; and a deployer configured to automatically deploy the certain cloud service into the network by using the provided security requirements.

BRIEF DESCRIPTION OF THE SEVERAL VIEWS OF THE DRAWINGS

In the following, exemplary embodiments of the present invention are described with reference to the enclosed figures.

Similar or functionally similar elements in the figures have been allocated the same reference signs if not otherwise indicated.

DETAILED DESCRIPTION

According to an embodiment of a first aspect, a method for automated network deployment of cloud services into a network is suggested. The method includes receiving a certain cloud service with a certain resource protection template specifying an isolation policy for isolating zones in the network, receiving certain customer protection parameters specifying customer needs regarding protection in the network, providing security requirements by matching the received resource protection template and the received customer protection parameters, and automatically deploying the certain cloud service into the network by using the provided security requirements.

According to some implementations, it is possible to configure a deployment mapping, from the resource protection template to the network, once and then automatically deploy all services that are based on this template without further human intervention. A benefit of this approach may be that security is also automatically configured by the used resource protection template, i.e., multi-tenant isolation as well as permitted flows between zones, in particular by firewall rules, may be derived from the given protection templates. Thus, services may be designed and deployed on a multi-instance basis.

According to some implementations, the present method for automatic network deployment of cloud services into a network may include architectural concepts and the network management process. Within the architectural concepts, a resource protection template may be provided including tiers and firewall rules. The resource protection template may also be called service protection template. Further, within the architectural concept, enterprise network segments may be provided including LANs, VLANs and TCP/IP information. Further, within the architectural concept, a mapping may be deployed between the tiers and the network segments. Further, within the network management process, multiple protection templates, e.g., including 1-tier, 3-tier and the like may be provided. Furthermore, within the network management process, the developer or service designer may select one of them and build service templates. Third, the provider or service deployer may map the tiers onto the enterprise network.

According to some implementations, cloud service definitions covering function characteristics of service, in particular resource protection, are provided. Further, existing formats, like TSAM, may be extended with security and compliance definitions for cloud computing. The isolated virtual networks in the network may be managed.

According to some implementations, the network may be a multi-tier enterprise network.

In an embodiment, a plurality N of cloud services and a plurality M of resource protection templates are provided, wherein each of the M resource protection templates is allocated to one of the N cloud services.

In a further embodiment, a plurality N of cloud services and a plurality M of resource protection templates are provided, with M=N, wherein each of the M resource protection templates is allocated to one of the N cloud services bijectively.

In a further embodiment, a plurality N of cloud services and a plurality M of resource protection templates are provided, with M<N, wherein each of the M resource protection templates is allocated to at least one of the N cloud services.

In a further embodiment, a plurality N of cloud services and a plurality M of resource protection templates are provided, with M>N, wherein at least one of the N cloud services is allocated to at least two of the M resource protection templates.

In a further embodiment, customization values are provided by a customer. The customization values include a first selection indication for selecting the certain cloud service from the provided N cloud services and the customer protection parameters for the certain cloud service.

In a further embodiment, customization values are provided by a customer, the customization values including a first selection indication for selecting the certain cloud service from the provided N cloud services, a second selection indication for selecting one of the at least two resource protection templates allocated to the certain cloud service and the customer protection parameters for the certain cloud service.

In a further embodiment, a plurality of isolated zones is specified by the isolation policy, wherein each zone of the plurality of zones is determined by a set of IP addresses allocated to certain resources.

In a further embodiment, resources allocated to the IP addresses of the same zone share the same security requirements.

In a further embodiment, each zone of the plurality of zones is divided into a number of resource groups, wherein each resource group of the number of resource groups is determined by a subset of the set of IP addresses of the zone that is referenced by means of a single name.

An isolation policy is a set of rules that define which resources can communicate with which other resources. Isolation policies differ in the granularity of resources and in the isolation mechanisms used to enforce isolation. For example, a very granular resource model would treat inter-application threads as resources; a slightly less granular model views entire applications as resources. In the following, an even less granular resource model is used and defined:

Definition I (Resource): A resource is an IP address that is used by at least one software component to send or receive network traffic.

A single (physical or virtual) machine can have multiple IP addresses, either by virtue of having multiple (physical or virtual) network adapters, a.k.a. network interface controllers (NICs), or by having multiple IP addresses assigned to a single NIC. The applications running on such a machine with multiple IP addresses then decide which specific IP address (on port) to attach to. In the following, the applications that attach to IP addresses are only relevant to the extent that they determine what communication flows the IP addresses may engage in. The specific nature of these applications, i.e., whether they are databases, block storage, or web servers, may be irrelevant. To summarize, the present granularity is given by using IP addresses as resources and formulating isolation policies on how those IP addresses can communicate with each other.

In practice, it might be too tedious to define isolation policies individually for each IP address (i.e., on a resource-by-resource basis). According to an embodiment, it is proposed to group IP addresses into zones and define isolation policies over zones:

Definition II (Zone): A zone is a set of IP addresses that trust each other, i.e., that do not need to be protected from each other, and that share the same security requirements for protection from outside environmental threats, i.e., "other" IP addresses.

A corollary from this definition is that IP addresses within any given zone can freely communicate among each other. Further, the IP addresses within a zone are protected by the isolation policy of that zone from the "outside world", i.e., other zones. To fully specify an isolation policy, the use of so called resource groups may be helpful:

Definition III (Resource Group): A resource group is a set of IP addresses within a single zone that is referenced by means of a name.

Resource groups may not span zones, as they are sets of IP addresses all of which belong to a single zone. Further zones are resource groups as well. Resource groups are a means to simplify the specification of isolation policies by referencing groups of IP addresses by a single name.

Next, the kind of present isolation policies is introduced. In the present model, isolation policies consist of ALLOW rules and DENY rules. ALLOW rules state that certain network flows must be possible, i.e., otherwise, the desired functionality cannot be provided. An example of an ALLOW rules is that in a 3-tier Web application, the Web server must be able to access the database in the third tier. DENY rules, by contrast, state that a particular network flow must not be possible, e.g., because otherwise an important vulnerability in an application would be exposed. Specifically:

[ALLOW|DENY]
<Source_Resource_Group, Target_Resource_Group, Target_port, UDP/TCP Protocol>

In specifying the Target_port, wildcards ("*"), port ranges (e.g., 80-90), and port lists (e.g., {80, 82, 84}) may be allowed. Isolation policies are formulated using resource groups, which are defined using statements like the following:

DEFINE resource_group_name 10.2.2.1, 10.2.3.*, 10.2.2.7-10.2.2.77, . . . ;

As for ports, wild-cards (10.2.3.*) and ranges (10.2.2.7-10.2.2.77) in the definition of resource groups are allowed. Two points are worth highlighting:

1. Isolation policies may be checked automatically for rule conflicts, i.e., incidents where one rule allows a particular network flow while another rule denies the very same flow. The policy author may be required to resolve such conflicts. Also, DENY rules that forbid flows between resource groups that belong to the same zone may be identified and eliminated. This is because as per our trust assumption, all intra-zone traffic is harmless and allowed. A DENY rule that goes against this trust assumption indicates a flawed zone design that may be addressed.

2. Any flow that is not explicitly allowed or denied is undetermined and may be either allowed or denied. This is an important degree of freedom and flexibility which the author of an isolation policy grants the party in charge of implementing it.

In a further embodiment, the cloud services are embodied as TSAM services, the TSAM services including TSAM service definitions, topology templates, build plans, management templates, resource allocation templates and the resource protection templates.

In a further embodiment, automatically deploying the certain cloud service into the network includes instancing a virtualized routing appliance and configuring the instanced virtualized routing appliance in dependence on the provided security requirements.

Any embodiment of the first aspect may be combined with any embodiment of the first aspect to obtain another embodiment of the first aspect.

According to an embodiment of a second aspect, a computer program is suggested which comprises a program code for executing the method of the above first aspect for automated network deployment of cloud services into a network when run on at least one computer.

According to an embodiment of a third aspect, a provider for automated network deployment of cloud services into a network is suggested. The provider includes a first receiver, a second receiver, a preparer, and a deployer. The first receiver is configured to receive a certain cloud service with a certain resource protection template specifying an isolation policy for isolating zones in the network. The second receiver is configured to receive certain customer protection parameters specifying customer needs regarding protection in the network. The preparer is configured to provide security requirements by matching the received resource protection template and the received customer protection parameters. Further, the deployer is configured to automatically deploy the certain cloud service into the network by using the provided security requirements.

The receiver may be any receiving means. The first receiver and the second receiver may be embodied by one single receiver. Moreover, the preparer may be any means for preparing, and the deployer may be any means for deploying.

The respective means may be implemented in hardware and/or in software. If the means are implemented in hardware, it may be embodied as a device, e.g., as a computer or as a processor or as a part of a system, e.g., a computer system. If the means are implemented in software it may be embodied as a computer program product, as a function, as a routine, as a program code or as an executable object.

According to an embodiment of a fourth aspect, a system for automated network deployment of cloud services into a network is suggested. The system includes a developer for developing a certain cloud service with a certain resource protection template specifying an isolation policy for isolating zones in the network, and the provider of above third aspect.

The developer may also be called cloud service developer. The developer develops a cloud service consisting of service topology templates, plans and possibly other configuration artifacts.

At first, embodiments of the present invention are explained in detail with reference to the example TSAM. Thus, the configuration artifacts may be TSAM configuration artifacts.

The provider may be also called cloud service provider. The provider operates a data center, on which it hosts cloud services. Providers may build their own cloud services or they may produce them from developers. The customer may also be called cloud service customer. The customer requests and uses cloud services from the provider. The provider is particularly responsible for security and risk management for all services provided. Further, the consumer end user is the end user, which are the people in the customer organization that use cloud services without being concerned with any aspects of providers contracting, billing, or management, are serviced by the customers.

In detail, the provider may use e.g., TSAM to implement and manage its cloud services. The developer may offer cloud services e.g., as TSAM service definitions, consisting of topology templates, build plans, management plans, resource allocation templates and the like. The isolation policy that the provider must enforce in order to properly protect the cloud service from outside threats is defined by the present security requirements which are generated as a match of the particular resource protection template and the particular customer protection parameters. In this regard, a new TSAM artifact may be created that enables cloud service developers to specify the isolation policy that cloud service providers may implement in order to properly protect the developer's services.

In analogy to resource allocation templates as discussed above, the resource protection templates may be used for this new TSAM artifact which essentially encodes an isolation policy.

For example, the developer may use a resource protection template to specify that in its 3-tier cloud service, wherein each third tier may be implemented as a separate zone and only the middle tier/zone may access the back end tier/zone via SSH (Secure Shell).

Because the developer may not make a proper risk assessment for its cloud services, it may receive the customer protection parameters from the customer. Thus, the respective cloud service may be subject to very different security and isolation requirements depending on the particular use of the respective service.

For example, if the particular service is an e-business service, the following different scenarios are possible in dependence on the respective customer.

If the customer is e.g., a bank in production deployment, the provider may run the e-business service for the bank. If the customer is a bank in test employment, the provider may run the e-business service as a trial for the same bank. Further, if the customer is e.g., a mom-and-pop shop in production deployment, the provider may run the e-business service for the mom-and-pop shop.

The point is that the very same e-business cloud service may be subject to very different security and isolation requirements, depending where, how and for what purpose the customer deploys the service. Here, it is beneficial that the services according to embodiments of the invention may be designed and deployed on a multi-instance basis.

In the following, the inter-dependencies between cloud developers, cloud providers and cloud customers in defining the isolation policies are explained. The developers develop cloud services, e.g., as TSAM service definitions consisting of topology templates, build plans, management plans and resource allocation templates. According to embodiments of the invention developers specify a resource protection template that specifies the isolation policy that is to be enforced by the cloud provider. The cloud customer further refines the resource protection template by adding its unique protection needs specified by the customer protection parameters. The cloud provider deploys and configures the developer's cloud service in a manner that honors the resource allocation template adjusted for the customer protection needs. Therefore, the resource protection template is matched with the customer protection parameter for providing the security requirements.

Another aspect is that the cloud provider may be restricted by its infrastructure. In particular, the provider's network design, e.g., including cabling, switches, routers and network-based firewalls, is the result of a deliberate design process that balances performance, security and the technological capability of the network. Thus, the following working assumption may be used: The L1-L3 network design (cabling, switches, routers, and network-based firewalls) is given, fixed, and static and shall not be modified when provisioning new resources or services in order to accommodate those resources' isolation needs. An exception to this rule is e.g., when TSAM has network management plans that were expressly designed to modify the network, e.g., by launching a new VLAN or reconfiguring firewalls. In this latter case, TSAM may invoke such network management plans in the course of new provisioning new resources or services.

According to embodiments, using TSAM services with resource protection templates may effect an extension to the TSAM node types. Nodes that represent virtual machines may be extended to offer a new attribute symbolicIPs, which lists symbolic names (such as IP1, WebSvr, or, Database_IP) for all IP addresses that are provided by this VM. TSAM nodes that represent application logic (e.g., a database or a Web server) may be extended by a new attribute called attachedIP, which references the symbolic IP address of the hosting VM that the application will attach to at run-time. This extension offers the beneficial flexibility to define the number of IP addresses offered by a VM and the IP addresses that applications bind to without naming actual physical IP addresses. TSAM may determine the actual physical IP addresses at deployment time. This can be achieved by having TSAM execute the following pseudo-code:

```
// Collect end-user input on the desired cloud service:
PROMPT end user for the name CS of the desired cloud service;
PROMPT end user for customization values (v_1, ..., v_d);
// Find for each symbolic IP address sIP the physical IP
// addresses that it may be deployed to:
FOR EACH symbolic IP address sIP in CS DO
        z := zone(sIP);     // let z be the zone of sIP; this zone is given
                            // by the resource protection template of CS.
    (IPrange[sIP], Plan_NM) := Table(z, v_1, ..., v_d);
    IF Plan_NM ≠ 0 THEN
        additional_IPs = EXECUTE Plan_NM;
        IPrange[sIP] := IPrange[sIP] + additional_IPs;
    ENDIF
    // IPrange[sIP] now stores the range of IP addresses (in
    // the provider's network) that sIP may be provisioned to.
ENDFOR
FOR EACH virtual machine VM in CS DO
// Provision and configure VM:
Symb_IPs :=
Get_Symbolic_IPs(VM);
H := Find a physical host such that
        for all symbolic IPs, sIP ∈ Symb_IPs : the host H can
            access at least one physical IP address in IPrange[sIP]
        and the host meets any additional requirements from
            resource allocation templates or other declarative constraints;
Provision the virtual machine VM to host H;
FOR EACH symbolic IP address sIP ∈ Symb_IPs DO
        actualIP[sIP] := a physical IP address from IPrange[sIP]
                            that host H can attach to;
ENDFOR
Configure the networking on VM so it binds to the
actualIPs[sIP], ∈ sIP;
When provisioning the applications A that run on
VM, make sure that A binds to the IP address
actualIP[A.attachedIP];
```

Further, in the following, an XML excerpt is depicted introducing an example for the syntax and semantics of resource protection templates. Note that the name space RPT is used for resource protection templates.

```
<rtp:Definitions>
    !-- Declare as many zones as needed. -->
    <rpt:Zone rpt:Name="...">
        <rpt:Description>
            Optional description of the zone's purpose.
        </rpt:Description>
```

-continued

```
<rpt:SymbolicIPs>
    <!-- List all symbolic IP addresses from the TSAM
        structural model that belong to this zone, e.g.,: -->
    ip1, ip13, ip16, ipSomething
    </rpt: SymbolicIPs>
    <!-- Define as many resource groups as needed: -->
    <rpt:ResourceGroup rpt:Name="...">
        <!-- List all symbolic IPs in this resource group, e.g., -->
        ip1, ipSomething
    </rpt:ResourceGroup>
</rpt:Zone>
<rpt:Zone rpt:Name="..."> ... </rpt:Zone>
</rpt:Definitions>
<rpt:IsolationPolicy>
    <!-- Define the isolation policy, using as many rules as needed -->
    <rpt:Rule rpt:Type="Allow">      <!-- Type can be "Allow"
    or "Deny" -->
        <!-- "rpt:id" can be used to refer to resource groups or
            symbolic IPs. -->
        <rpt:Source rpt:id="..."/>
        <rpt:Target rpt:id="..."/>
        <rpt:TargetPorts> 80, 120, 1200-1666 </rpt:TargetPorts>
        <rpt:Protocol> TCP, ... </rpt:Protocol>
        <!-- List any additional protocols covered. -->
    </rpt:Rule>
    <rpt:Rule rpt:Type="..."> ... </rpt:Rule>
</rpt:IsolationPolicy>
```

As indicated above, the customer protection needs can be specified by the customer protection parameters. In this regard, the end-users of the cloud customer express their security/isolation needs by choosing customization values along various customization dimensions. Both, the customization dimensions and the eligible values in each dimension may be fixed, pre-determined, and apply to all zones of the cloud service that is being ordered.

As indicated above, the cloud provider defines together with the cloud customer what customization dimensions and values they want to offer to the customer's end-users. These dimensions and values can be encoded in an XML file as follows (using cpn for the namespace of customer protection needs):

```
<cpn:Dimension cpn:Name="...">
    <!-- Defines a customization dimension consisting of a name and
        values. -->
    <cpn:Description>
        Enter an optional help text to explain this dimension.
    </cpn:Description>
    <cpn:Value cpn:Default="yes">
        Enter mnemonic name
        <cpn:Description>
            Enter an optional help text to explain this value.
        </cpn:Description>
    </cpn:Value>
    <cpn:Value cpn:Default="no"> ... </cpn:Value>
    ...
</cpn:Dimension>
...
<!-- Plus any additional dimensions needed. -->
```

This XML code defines the drop-down menu that the end-user sees when ordering a cloud service. By "clicking" concrete values from the drop-down menu, the end-user may customize the security of its cloud service. The semantics of this customization is encoded in the table that performs the mapping Zone×CustomizationValues→(IP-Range, NetwMgmt-Plan)

Reading the names of dimensions and values (possibly combined with the optional descriptions) these semantics should be self-evident to the end-user so s/he can perform the necessary customization without being a security expert.

Figure 1:
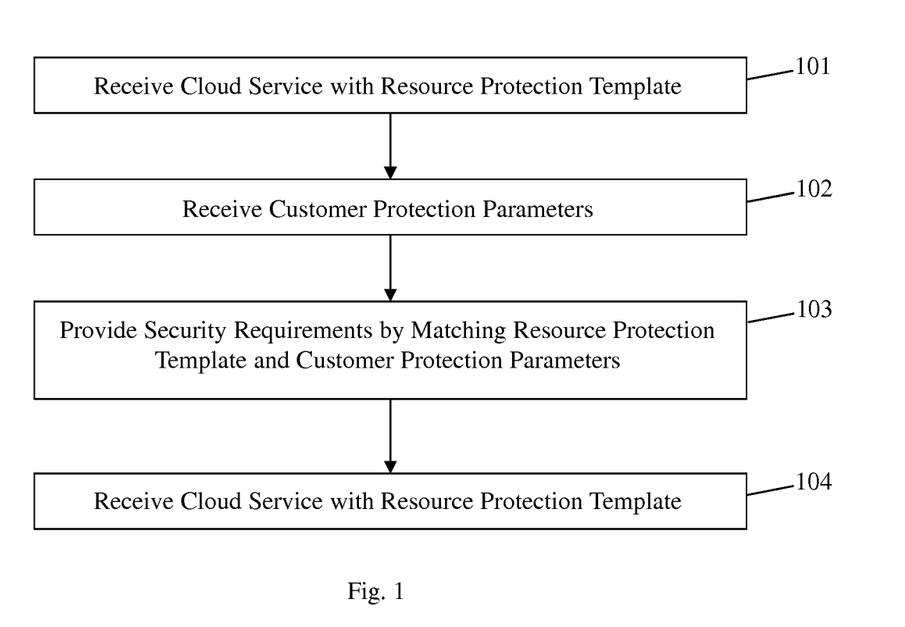
FIG. 1 shows an embodiment of a sequence of method operations for automated network deployment of cloud services into a network.
Figure 2:
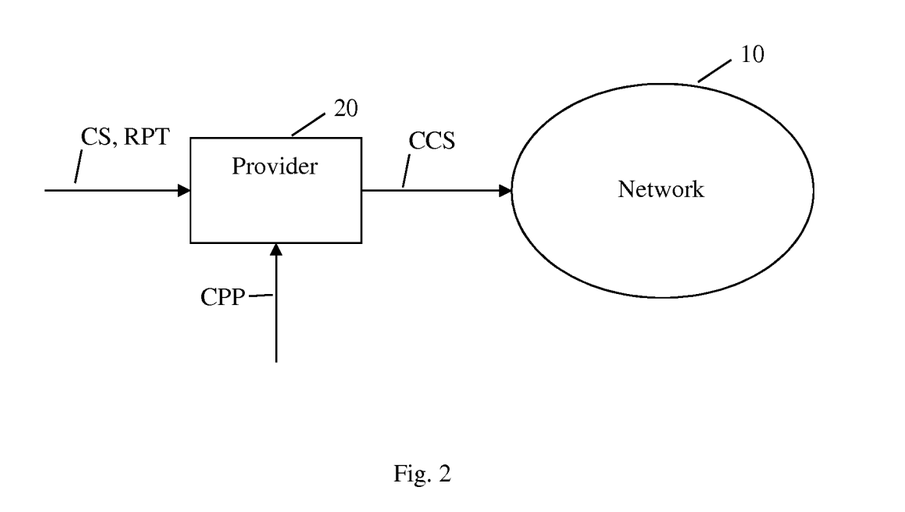
FIG. 2 shows a schematic block diagram of a first embodiment of a provider for automated network deployment of cloud services into a network.

In the following, the figures are described in detail:

In FIG. 1, an embodiment of a sequence of method operations for automated network deployment of cloud services CS into a network 10 is depicted (see also FIG. 2).

The method has the following operations 101 to 104:

In operation 101, a certain cloud service CS with a certain resource protection template RPT is received. The certain resource protection template RPT specifies an isolation policy for isolating zones in the network 10. The certain cloud service CS may be received by a provider 20 (see FIG. 4). The certain cloud service CS may be developed and provided by a developer 30 to the provider 20.

For example, a plurality N of cloud services CS and a plurality M of resource protection templates RPT may be provided, in particular by the developer 30. In this regard, each of the M resource protection templates RPT may be allocated to one of the N cloud services CS. For these allocations, the following three alternatives may be noted exemplarily:

In a first alternative, the plurality N of cloud services CS and the plurality M of resource protection templates RPT match to each other, with M=N, wherein each of the M resource protection templates RPT is allocated to one of the N cloud services CS bijectively.

In a second alternative, the plurality N of cloud services is greater than the plurality of M of resource protection templates RPT, with M<N, where each of the M resource protection templates RPT is allocated to at least one of the N cloud services CS.

In a third alternative, the plurality N of cloud services CS is smaller than the plurality M of resource protection templates RPT, with M>N, wherein at least one of the N cloud services CS is allocated to at least two of the M resource protection templates RPT.

Coming back to the isolation policy specified by the certain resource protection template RPT, the isolation policy may specify a plurality of isolated zones in the network. Therein, each zone of the plurality of zones may be determined by a set of IP addresses allocated certain resources, e.g., computing resources and memory resources. In particular, resources allocated to the IP addresses of the same zone or isolated zone share the same security requirements SR.

Moreover, each zone of the plurality of zones may be divided into a number of resource groups, each resource group of the number of resource groups may be determined by a subset of the set of IP addresses of the zone that is referenced by means of a single name.

As an example, the cloud services CS may be provided as TSAM services, the TSAM services may include TSAM service definitions, topology templates, build plans, management templates, resource allocation templates and the resource protection templates RPT.

In operation 102, certain customer protection parameters CPP are received, in particular by the provider 20. The certain customer protection parameters CPP specify customer needs regarding protection in the network 10.

Figure 4:
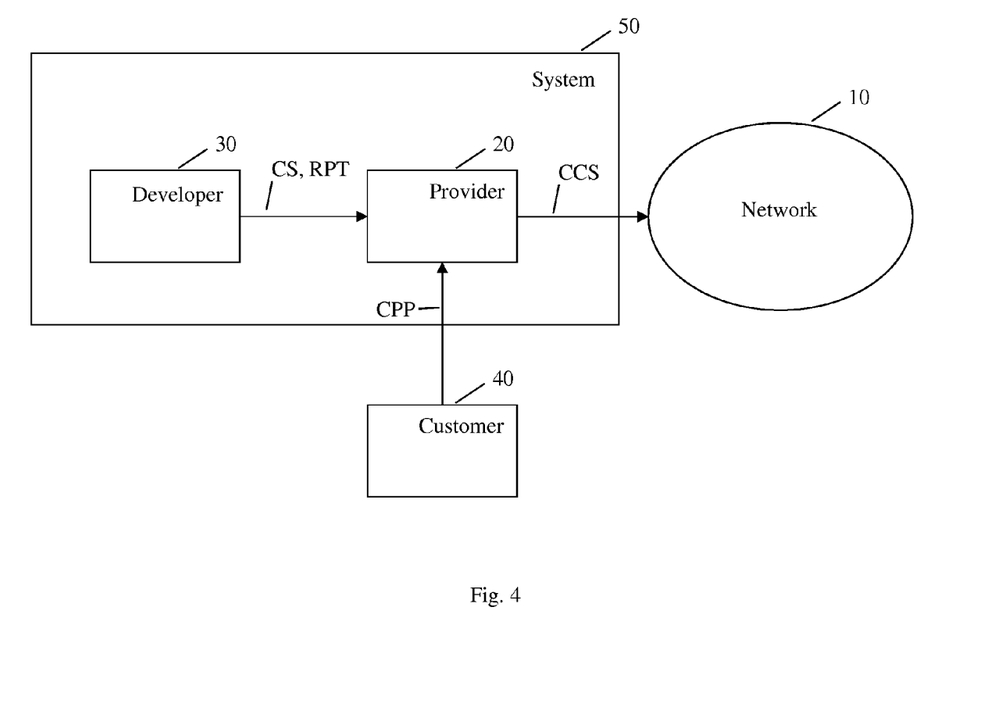
FIG. 4 shows a schematic block diagram of an embodiment of a system for automated network deployment of cloud services into a network.

For example, the customer protection parameters CPP may be part of customization values CV provided by the customer 40 (see FIG. 4, for example). The customization values CV may include a first selection indication for selecting the certain cloud service CS from the provided N cloud services CS and the customer protection parameters CPP for the certain (selected) cloud service CS.

In case of the above-mentioned third alternative in operation 101, the customization values CV include the first selection indication for selecting the certain cloud service CS from the provided N cloud service CS, a second selection indication for selecting one of the at least two resource protection templates RPT allocated to the certain cloud service CS and the customer protection parameters CPP for the certain cloud service CS.

In operation 103, security requirements SR are provided by matching the received resource protection template RPT and the received customer protection parameters CPP.

In operation 104, the certain cloud service CS is automatically deployed into the network 10 by using the provided security requirements SR.

FIG. 2 shows a schematic block diagram of a first embodiment of a provider 20 for automatic network deployment of cloud services CS into network 10. The provider 20 is configured to receive a certain cloud service CS with a certain resource protection template RPT specifying an isolation policy for isolating zones in the network 10.

Further, the provider 20 is configured to receive certain customer protection parameters CPP specifying customer needs regarding protection in the network 10. Furthermore, the provider 20 generates security requirements SR by matching the received resource protection template RPT and the received customer protection parameters CPP. By using the provided security requirements SR, the provider 20 automatically deploys the certain cloud service CS as a customized cloud service CCS into the network 10.

Figure 3:
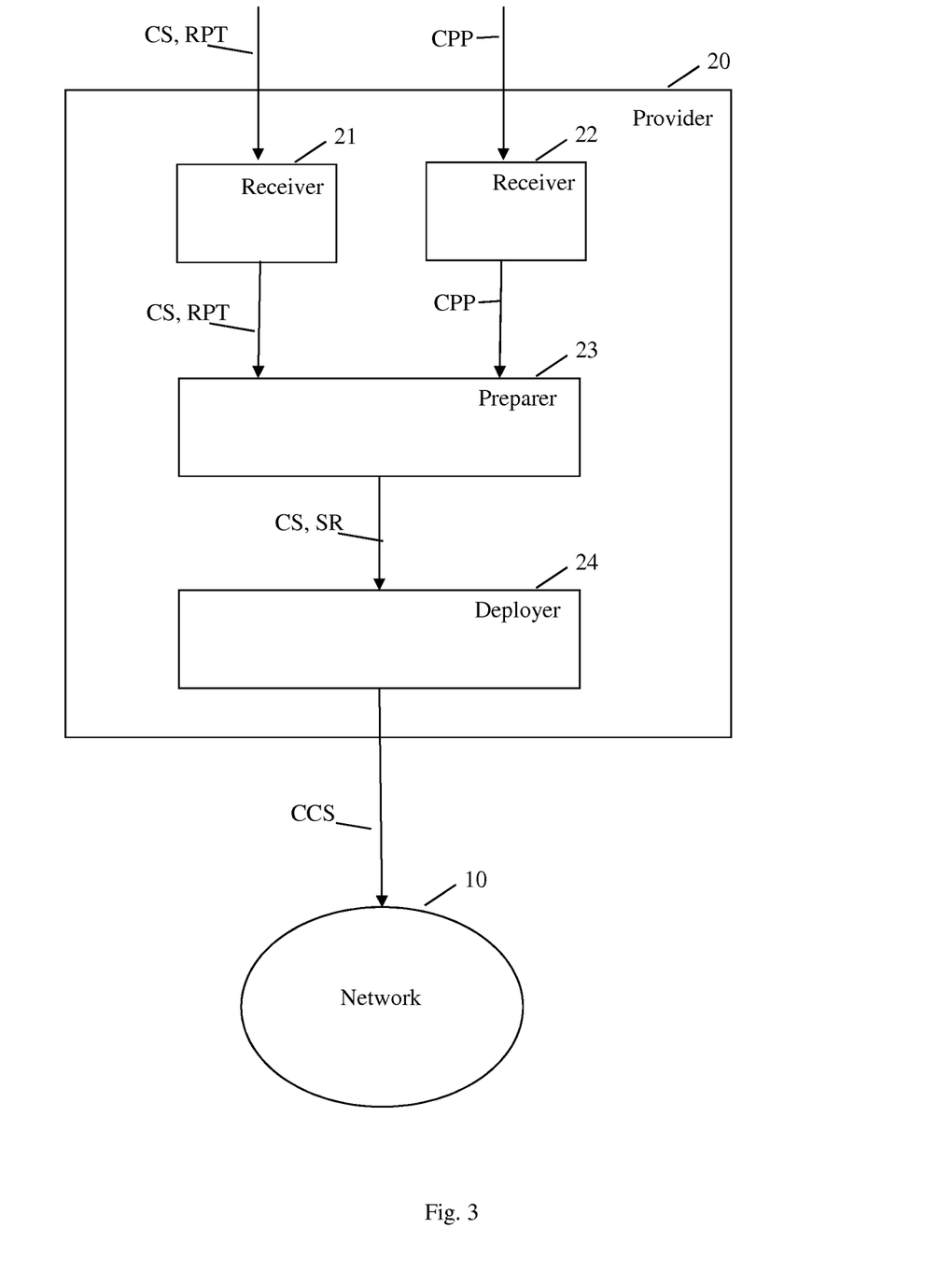
FIG. 3 shows a schematic block diagram of a second embodiment of a provider for automated network deployment of cloud services into a network.

In FIG. 3, a schematic block diagram of a second embodiment of a provider 20 for automatic network deployment of cloud services CS into a network 10 is depicted.

The provider 20 of FIG. 3 has a first receiver 21, a second receiver 22, a preparer 23 and a deployer 24. The first receiver 21 is adapted to receive a certain cloud service CS with a certain resource protection template RPT. The certain resource protection template RPT specifies an isolation policy for isolating zones in the network 10. The certain cloud service CS is developed and provided by a developer 30 (see FIG. 4).

The second receiver 22 is adapted to receive certain customer protection parameters CPP specifying customer needs regarding protection in the network 10. The certain customer protection parameters CPP are provided by a customer 40 (see FIG. 4).

The preparer 23 is adapted to provide security requirements SR by matching the received resource protection template RPT and the received customer protection parameters CPP. The security requirements SR and the certain cloud service CS are provided to the deployer 24. The deployer 24 is adapted to automatically deploy the certain cloud service CS into the network 10 by using the provided security requirements SR.

The automatically deployed certain cloud service CS is referenced as a customized cloud service CCS in FIG. 3.

FIG. 4 shows a schematic block diagram of an embodiment of a system 50 for automatic network deployment of cloud services CS into a network 10. The system 50 includes the provider 20 as shown in FIG. 3. Further, the system 50 includes a developer 30 for developing and providing a certain cloud service CS with a certain resource protection template RPT specifying the isolation policy for isolating zones in the network 10. Further, FIG. 4 shows that the customer protection parameters CPP are provided by a customer 40 to the provider 20 of the system 50.

Computerized devices can be suitably designed for implementing embodiments of the present invention as described herein. In that respect, it can be appreciated that the methods described herein are largely non-interactive and automated.

In exemplary embodiments, the methods described herein can be implemented either in an interactive, partly-interactive or non-interactive system. The methods described herein can be implemented in software (e.g., firmware), hardware, or a combination thereof. In exemplary embodiments, the methods described herein are implemented in software, as an executable program, the latter executed by suitable digital processing devices. In further exemplary embodiments, at least one operation or all operations of above method of FIG. 1 may be implemented in software, as an executable program, the latter executed by suitable digital processing devices. More generally, embodiments of the present invention can be implemented wherein general-purpose digital computers, such as personal computers, workstations, etc., are used.

Figure 5:
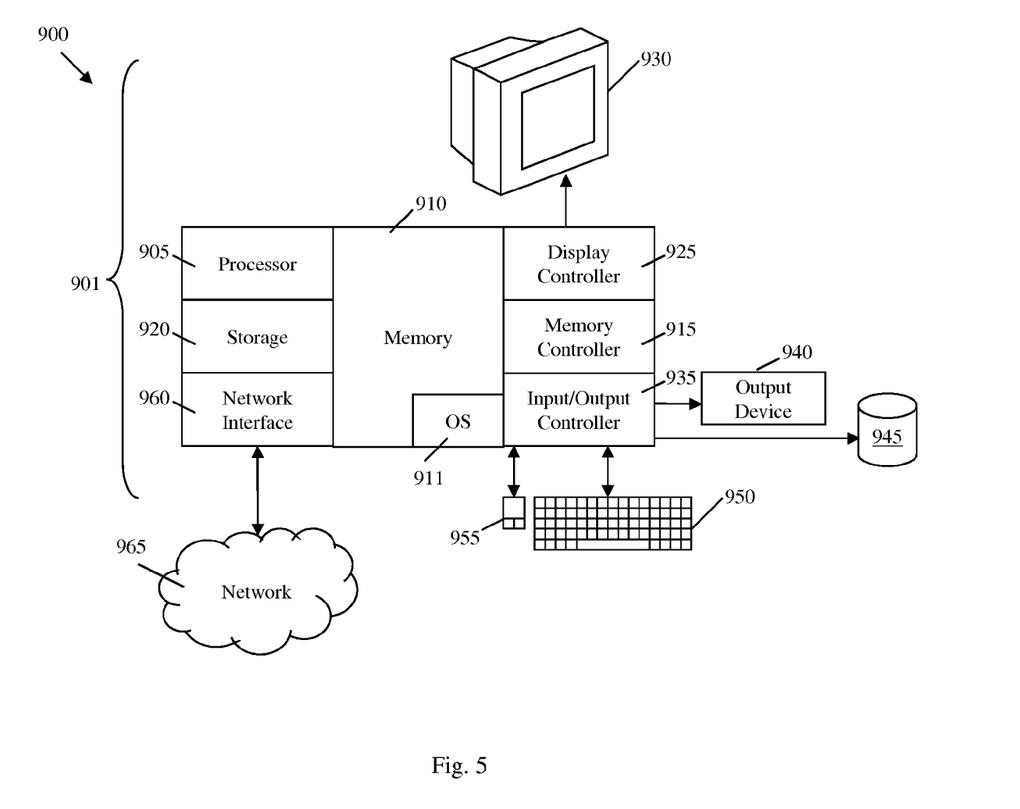
FIG. 5 shows a schematic block diagram of an embodiment of a system for automated network deployment of cloud services into a network.

For instance, the system 900 depicted in FIG. 5 schematically represents a computerized unit 901, e.g., a general-purpose computer. In exemplary embodiments, in terms of hardware architecture, as shown in FIG. 5, the unit 901 includes a processor 905, memory 910 coupled to a memory controller 915, and one or more input and/or output (I/O) devices 940, 945, 950, 955 (or peripherals) that are communicatively coupled via a local input/output controller 935. The input/output controller 935 can be, but is not limited to, one or more buses or other wired or wireless connections, as is known in the art. The input/output controller 935 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 905 is a hardware device for executing software, particularly that stored in memory 910. The processor 905 can be any custom made or commercially available processor, a central processing unit (CPU), an auxiliary processor among several processors associated with the computer 901, a semiconductor based microprocessor (in the form of a microchip or chip set), or generally any device for executing software instructions.

The memory 910 can include any one or combination of volatile memory elements (e.g., random access memory) and nonvolatile memory elements. Moreover, the memory 910 may incorporate electronic, magnetic, optical, and/or other types of storage media. Note that the memory 910 can have a distributed architecture, where various components are situated remote from one another, but can be accessed by the processor 905. For example, the device 20 may be embodied in the processor 905.

The software in memory 910 may include one or more separate programs, each of which comprises an ordered listing of executable instructions for implementing logical functions. In the example of FIG. 5, the software in the memory 910 includes methods described herein in accordance with exemplary embodiments and a suitable operating system (OS) 911. The OS 911 essentially controls the execution of other computer programs, such as the methods as described herein (e.g., FIG. 1), and provides scheduling, input-output control, file and data management, memory management, and communication control and related services.

The methods described herein may be in the form of a source program, executable program (object code), script, or any other entity comprising a set of instructions to be performed. When in a source program form, then the program needs to be translated via a compiler, assembler, interpreter, or the like, as known per se, which may or may not be included within the memory 910, so as to operate properly in connection with the OS 911. Furthermore, the methods can be written as an object oriented programming language, which has classes of data and methods, or a procedure programming language, which has routines, subroutines, and/or functions.

Possibly, a conventional keyboard 950 and mouse 955 can be coupled to the input/output controller 935. Other I/O devices 940-955 may include sensors (especially in the case of network elements), i.e., hardware devices that produce a measurable response to a change in a physical condition like temperature or pressure (physical data to be monitored). Typically, the analog signal produced by the sensors is digitized by an analog-to-digital converter and sent to controllers 935 for further processing. Sensor nodes are ideally small, consume low energy, are autonomous and operate unattended.

In addition, the I/O devices 940-955 may further include devices that communicate both inputs and outputs. The system 900 can further include a display controller 925 coupled to a display 930. In exemplary embodiments, the system 900 can further include a network interface or transceiver 960 for coupling to a network 965.

The network 965 transmits and receives data between the unit 901 and external systems. The network 965 is possibly implemented in a wireless fashion, e.g., using wireless protocols and technologies, such as WiFi, WiMax, etc. The network 965 may be a fixed wireless network, a wireless local area network (LAN), a wireless wide area network (WAN) a personal area network (PAN), a virtual private network (VPN), intranet or other suitable network system and includes equipment for receiving and transmitting signals.

The network 965 can also be an IP-based network for communication between the unit 901 and any external server, client and the like via a broadband connection. In exemplary embodiments, network 965 can be a managed IP network administered by a service provider. Besides, the network 965 can be a packet-switched network such as a LAN, WAN, Internet network, etc.

If the unit 901 is a PC, workstation, intelligent device or the like, the software in the memory 910 may further include a basic input output system (BIOS). The BIOS is stored in ROM so that the BIOS can be executed when the computer 901 is activated.

When the unit 901 is in operation, the processor 905 is configured to execute software stored within the memory 910, to communicate data to and from the memory 910, and to generally control operations of the computer 901 pursuant to the software. The methods described herein and the OS 911, in whole or in part are read by the processor 905, typically buffered within the processor 905, and then executed. When the methods described herein (e.g., with reference to FIG. 1) are implemented in software, the methods can be stored on any computer readable medium, such as storage 920, for use by or in connection with any computer related system or method.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects. Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the unit 901, partly thereon, partly on a unit 901 and another unit 901, similar or not.

Aspects of the present invention are described above with reference to flowchart illustrations and/or block diagrams of methods, apparatus (systems) and computer program products according to embodiments of the invention. It will be understood that each block of the flowchart illustrations and/or block diagrams can be implemented by one or more computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be loaded onto a computer, other programmable data processing apparatus, or other devices to cause a series of operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved and algorithm optimization. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

More generally, while the present invention has been described with reference to certain embodiments, it will be understood by those skilled in the art that various changes may be made and equivalents may be substituted without departing from the scope of the present invention. In addition, many modifications may be made to adapt a particular situation to the teachings of the present invention without departing from its scope. Therefore, it is intended that the present invention not be limited to the particular embodiments disclosed, but that the present invention will include all embodiments falling within the scope of the appended claims.

The invention claimed is:

1. A method for automated network deployment of cloud services into a network, the method comprising:
receiving a certain cloud service with a certain resource protection template specifying an isolation policy for isolating zones in the network, wherein each zone of the plurality of zones is determined by a set of IP addresses allocated to certain resources, wherein each zone of the plurality of zones is divided into a number of resource groups, each resource group of the number of resource groups being determined by a subset of the set of IP addresses of the zone that is referenced by means of a single name, wherein a plurality N of cloud services and plurality M of resource protection templates are provided, with M>N, wherein at least one of the N cloud services is allocated to at least two of the M resource protection templates, and wherein the isolation policy includes a set of rules that define which resources are allowed to communicate with which other resources;
receiving certain customer protection parameters specifying customer needs regarding protection in the network;
providing security requirements by matching the received resource protection template and the received customer protection parameters, and
automatically deploying the certain cloud service into the network by using the provided security requirements.

2. The method of claim 1, wherein a plurality N of cloud services and a plurality M of resource protection templates are provided, wherein each of the M resource protection templates is allocated to one of the N cloud services.

3. The method of claim 1, wherein a plurality N of cloud services and a plurality M of resource protection templates are provided, with M=N, wherein each of the M resource protection templates is allocated to one of the N cloud services bijectively.

4. The method of claim 1, wherein a plurality N of cloud services and a plurality M of resource protection templates are provided, with M N, wherein each of the M resource protection templates is allocated to at least one of the N cloud services.

5. The method of claim 2, wherein customization values are provided by a customer, the customization values including a first selection indication for selecting the certain cloud service from the provided N cloud services and the customer protection parameters for the certain cloud service.

6. The method of claim 2, wherein customization values are provided by a customer, the customization values including a first selection indication for selecting the certain cloud service from the provided N cloud services, a second selection indication for selecting one of the at least two resource protection templates allocated to the certain cloud service and the customer protection parameters for the certain cloud service.

7. The method of claim 1, wherein resources allocated to the IP addresses of the same zone share the same security requirements.

8. The method of claim 1, wherein the cloud services are embodied as Tivoli Services Automation Manager, TSAM, services, the TSAM services including TSAM service definitions, topology templates, build plans, management templates, resource allocation templates and the resource protection templates.

9. The method of claim 1, wherein automatically deploying the certain cloud service into the network includes instancing a virtualized routing appliance and configuring the instanced virtualized routing appliance in dependence on the provided security requirements.

10. The method of claim 1, further comprising automatically checking any conflicts within the set of rules of the isolation policy.

11. A computer program product for automated network deployment of cloud services into a network, the computer program product comprising a computer readable storage medium having program instructions embodied therewith, wherein the computer readable storage medium is not a transitory signal, the program instructions executable by a computer to cause the computer to perform a method comprising:
receiving a certain cloud service with a certain resource protection template specifying an isolation policy for isolating zones in the network, wherein each zone of the plurality of zones is determined by a set of IP addresses allocated to certain resources, wherein each zone of the plurality of zones is divided into a number of resource groups, each resource group of the number of resource groups being determined by a subset of the set of IP addresses of the zone that is referenced by means of a single name, wherein a plurality N of cloud services and plurality M of resource protection templates are provided, with M>N, wherein at least one of the N cloud services is allocated to at least two of the M resource protection templates, and wherein the isolation policy includes a set of rules that define which resources are allowed to communicate with which other resources;
receiving certain customer protection parameters specifying customer needs regarding protection in the network;
providing security requirements by matching the received resource protection template and the received customer protection parameters; and
automatically deploying the certain cloud service into the network by using the provided security requirements.

12. The computer program product of claim 11, wherein the method further comprises automatically checking any conflicts within the set of rules of the isolation policy.

13. A provider for automated network deployment of cloud services into a network, the provider comprising:
a first receiver configured to receive a certain cloud service with a certain resource protection template specifying an isolation policy for isolating zones in the network, wherein each zone of the plurality of zones is determined by a set of IP addresses allocated to certain resources, wherein each zone of the plurality of zones is divided into a number of resource groups, each resource group of the number of resource groups being determined by a subset of the set of IP addresses of the zone that is referenced by means of a single name, wherein a plurality N of cloud services and plurality M of resource protection templates are provided, with M>N, wherein at least one of the N cloud services is allocated to at least two of the M resource protection templates, and wherein the isolation policy includes a set of rules that define which resources are allowed to communicate with which other resources;

a second receiver configured to receive certain customer protection parameters specifying customer needs regarding protection in the network;

a preparer configured to provide security requirements by matching the received resource protection templates and the received customer protection parameters; and a deployer configured to automatically deploy the certain cloud service into the network by using the provided security requirements.

\* \* \* \* \*